United States Patent
Willing et al.

(10) Patent No.: US 11,674,463 B2
(45) Date of Patent: Jun. 13, 2023

(54) METHOD FOR OPERATING AN INTERNAL COMBUSTION ENGINE OF A DRIVETRAIN OF A VEHICLE DURING LAUNCHING

(71) Applicant: Dr. Ing. h.c. F. Porsche Aktiengesellschaft, Stuttgart (DE)

(72) Inventors: Michael Willing, Niefern-Öschelbronn (DE); Moritz Martiny, Karlsruhe (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 0 days.

(21) Appl. No.: 17/701,833

(22) Filed: Mar. 23, 2022

(65) Prior Publication Data

US 2022/0333540 A1 Oct. 20, 2022

(30) Foreign Application Priority Data

Apr. 15, 2021 (DE) ...................... 10 2021 109 520.4

(51) Int. Cl.
| | | |
|---|---|---|
| *F02D 41/02* | (2006.01) | |
| *F01N 3/20* | (2006.01) | |
| *B60W 50/10* | (2012.01) | |
| *B60W 50/12* | (2012.01) | |

(52) U.S. Cl.
CPC ......... *F02D 41/0255* (2013.01); *B60W 50/10* (2013.01); *B60W 50/12* (2013.01);
(Continued)

(58) Field of Classification Search
CPC ......... F02D 41/0255; F02D 2200/0804; F02D 41/062; F02D 41/086; F02D 41/024;
(Continued)

(56) References Cited

U.S. PATENT DOCUMENTS

| | | |
|---|---|---|
| 5,327,991 A | 7/1994 | Yoshida |
| 9,108,635 B2 | 8/2015 | Miyazaki et al. |
| | (Continued) | |

FOREIGN PATENT DOCUMENTS

| | | |
|---|---|---|
| DE | 10333210 A1 | 1/2005 |
| DE | 102009027641 A1 | 1/2011 |
| | (Continued) | |

OTHER PUBLICATIONS

Japanese Office Action for Japanese Application No. 2022-042607, dated Mar. 8, 2023, with English translation, 9 pages.

*Primary Examiner* — Brandon D Lee
(74) *Attorney, Agent, or Firm* — RatnerPrestia

(57) ABSTRACT

A method for operating an internal combustion engine of a drivetrain of a vehicle during launching. The vehicle has an exhaust-gas aftertreatment system for purifying exhaust gas of the engine. After a starting operation of the engine, the drivetrain is operated in a first operating state. In this first operating state, the engine is operated at idle, the exhaust-gas aftertreatment system is heated by the internal combustion engine, and a launch prohibition is active. The launch prohibition that is active in the first operating state prevents launching using the internal combustion engine. After a predefined state of the exhaust-gas aftertreatment system has been attained, the drivetrain is operated in a second operating state. The launch prohibition is inactive in the second operating state, such that launching using the engine is possible in the second operating state.

14 Claims, 1 Drawing Sheet

(52) U.S. Cl.
CPC ... *F01N 3/2006* (2013.01); *B60W 2710/0677* (2013.01); *F01N 3/2013* (2013.01); *F01N 2900/08* (2013.01); *F01N 2900/1602* (2013.01)

(58) Field of Classification Search
CPC ............... B60W 50/10; B60W 50/12; B60W 2710/0677; F01N 3/2006; F01N 3/2013; F01N 2900/08; F01N 2900/1602; F01N 2240/16; F01N 9/00
See application file for complete search history.

(56) References Cited

U.S. PATENT DOCUMENTS

| | | | |
|---|---|---|---|
| 2010/0107608 A1* | 5/2010 | Mitsutani | B60L 50/16 60/299 |
| 2016/0137191 A1* | 5/2016 | Bang | B60W 20/40 180/65.265 |
| 2021/0155225 A1* | 5/2021 | Choi | F02D 41/0055 |
| 2021/0221226 A1* | 7/2021 | Aoki | B60K 6/24 |
| 2022/0025797 A1* | 1/2022 | Tolley | F01N 3/021 |

FOREIGN PATENT DOCUMENTS

| | | |
|---|---|---|
| DE | 102009027642 A1 | 1/2011 |
| DE | 112011104708 B4 | 5/2018 |
| EP | 3909823 A1 | 11/2021 |
| JP | H05222925 A | 8/1993 |
| JP | 2548065 Y2 | 9/1997 |
| JP | 2003227366 A | 8/2003 |
| JP | 2013112126 A | 6/2013 |

* cited by examiner

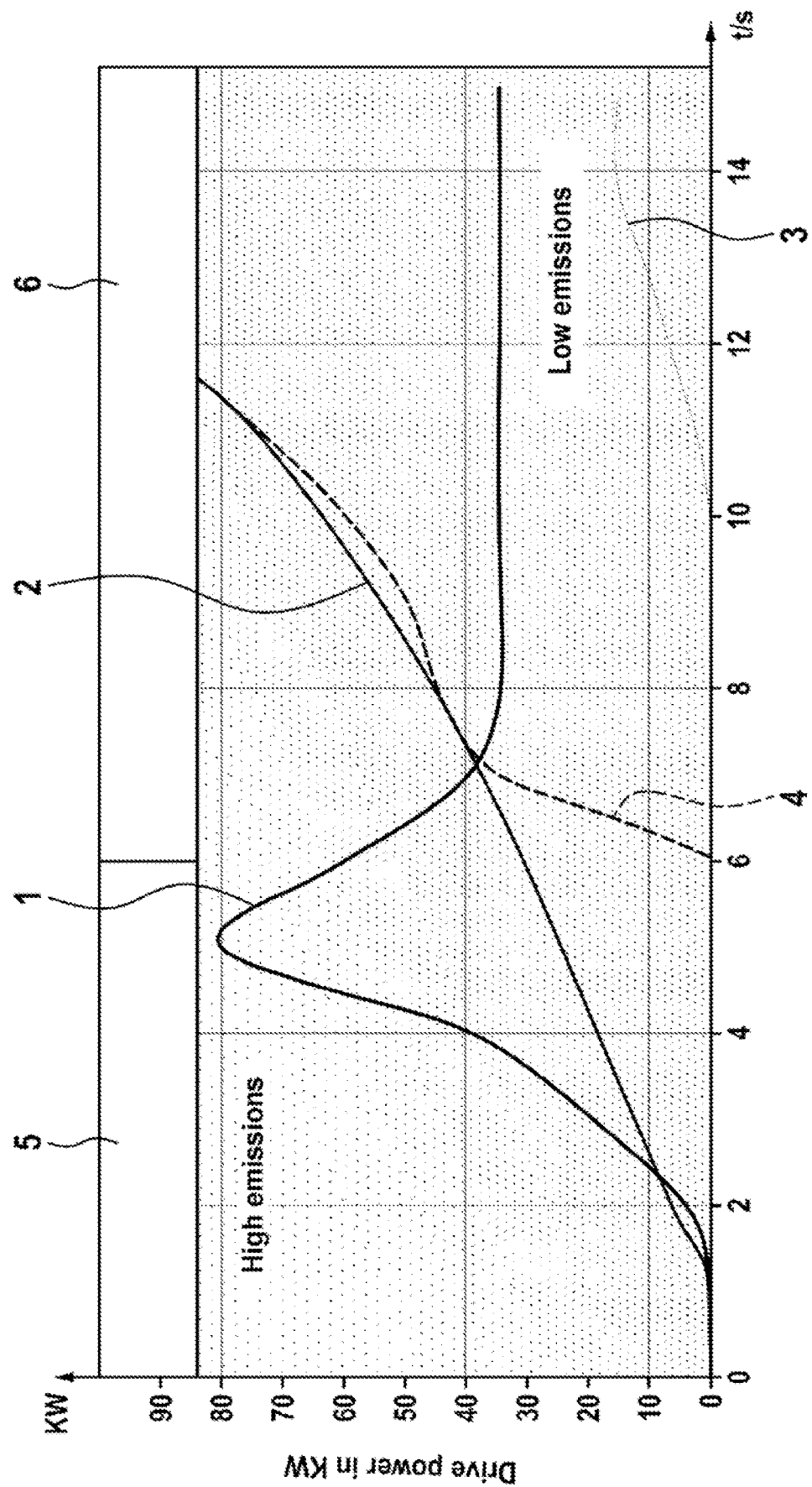

METHOD FOR OPERATING AN INTERNAL COMBUSTION ENGINE OF A DRIVETRAIN OF A VEHICLE DURING LAUNCHING

CROSS-REFERENCE TO RELATED APPLICATION

This application claims priority to German Patent Application No. 10 2021 109 520.4, filed Apr. 15, 2021, the content of such application being incorporated by reference herein in its entirety.

FIELD OF THE INVENTION

The invention relates to a method for operating an internal combustion engine of a drivetrain of a vehicle during launching, and to a vehicle.

BACKGROUND OF THE INVENTION

In particular from the aspect of compliance with future emissions requirements in motor vehicles, it is necessary to avoid operating states of a motor vehicle, in particular operating states of a motor vehicle, in particular of an internal combustion engine, in which high exhaust-gas emissions occur. High emissions, so-called cold emissions, occur in particular during the heating phase of an exhaust-gas aftertreatment system, that is to say a phase in which the exhaust-gas aftertreatment system cannot yet impart its full effect. The level of the cold emissions is highly dependent on the customer's driving style and the heating power of the exhaust-gas aftertreatment system. Such cold emissions occur in particular during a first launch of the motor vehicle after the initial starting of an internal combustion engine of the motor vehicle because, during this first launch or the first starting-off operation after the motor vehicle has been at a standstill for a relatively long period of time, the exhaust-gas aftertreatment system is at a temperature that is lower than the actual operating temperature or the operating temperature window of the exhaust-gas aftertreatment system, wherein the exhaust-gas aftertreatment system imparts its full or at least an acceptable effect only at the operating temperature. Thus, below the operating temperature of the exhaust-gas aftertreatment system, exhaust gases with a relatively high load of harmful pollutants emerge from the exhaust-gas system.

DE 11 2011 104 708 B4, which is incorporated by reference herein, has disclosed a hybrid vehicle that has an internal combustion engine and a catalytic converter. Said document describes a method for operating a hybrid vehicle, wherein, during an initial starting operation that takes place when the internal combustion engine is cold, at least electric launching of the hybrid vehicle is performed, and the internal combustion engine is started before, during or after the launching operation and is operated in a combustion mode which is separate from the electric operation of the electric machine and which serves for heating the catalytic converter.

Furthermore, DE 10 2009 027 642 A1, which is incorporated by reference herein, describes a method for controlling a drivetrain of a hybrid vehicle, wherein, during an initial starting operation of the hybrid drive that takes place when the internal combustion engine is cold, at least electric launching of the hybrid vehicle is performed, and wherein the internal combustion engine is started before, during or after the launching operation and is operated in a combustion mode which is separate from the electric operation of the electric machine and which serves for heating the catalytic converter.

DE 10 2009 027 641 A1 and DE 103 33 210 A1, which is incorporated herein by reference, constitute further prior art.

SUMMARY OF THE INVENTION

Described herein is a method and a vehicle that is distinguished by particularly low emissions during launching or starting-off operations. In particular, the method according to aspects of the invention is a method for operating an internal combustion engine during a cold starting-off operation, that is to say a starting-off operation when the internal combustion engine is cold.

The method according to aspects of the invention is a method for operating an internal combustion engine of a drivetrain of a vehicle during launching of the vehicle. The vehicle has an exhaust-gas aftertreatment system for purifying exhaust gas of the internal combustion engine, wherein, after a starting operation of the internal combustion engine, the drivetrain is operated in a first operating state, wherein, in this first operating state, the internal combustion engine is operated at idle. The exhaust-gas aftertreatment system is heated by means of the internal combustion engine, in particular by means of the exhaust gases thereof. In this first operating state, a launch prohibition is active, wherein the launch prohibition that is active in the first operating state prevents launching using the internal combustion engine. Launching of the vehicle, or a starting-off operation of the motor vehicle, is accordingly not possible. The launch prohibition may in particular be configured such that, when the launch prohibition is active, an engagement of a gear by the driver of the motor vehicle is not possible.

After a predefined state of the exhaust-gas aftertreatment system has been attained, in particular a specified operating temperature of the exhaust-gas aftertreatment system, the drivetrain is operated in a second operating state, wherein the launch prohibition is inactive in the second operating state, such that launching using the internal combustion engine is possible in the second operating state.

The method according to aspects of the invention thus ensures that, after a starting operation of the internal combustion engine, the exhaust-gas aftertreatment system firstly attains a predefined state, in particular a predefined temperature, such that the efficiency of the exhaust-gas aftertreatment system is increased. During this time, the vehicle cannot be launched using the internal combustion engine, whereby a high power demand on the internal combustion engine for the purposes of launching of the vehicle, which is associated with high emissions, is avoided.

Launching using the internal combustion engine is possible for the first time in the second operating state, that is to say in a state in which the exhaust-gas aftertreatment system has reached the required efficiency. In this way, high emissions owing to launching whilst the exhaust-gas aftertreatment system exhibits reduced efficiency are avoided.

It is by all means conceivable that, in the first operating state, a rotational speed of the internal combustion engine cannot be influenced by the driver of the vehicle, for example a depression of the accelerator pedal does not lead to an increase in the rotational speed of the internal combustion engine.

It is considered to be particularly advantageous if the exhaust-gas aftertreatment system is electrically heatable, in particular has an electrically heatable catalytic converter, wherein the exhaust-gas aftertreatment system is electrically heated prior to the starting of the internal combustion engine. This has the advantage that the exhaust-gas aftertreatment system is already at an elevated operating temperature before exhaust gas of the internal combustion engine enters the exhaust-gas aftertreatment system. Furthermore, the heating of the exhaust-gas aftertreatment system is accelerated, and the second operating state of the drivetrain is thus attained more quickly. It is by all means conceivable for a carrier mass flow to also be introduced into the exhaust-gas aftertreatment system in order to distribute the heat generated during the electric heating operation in the exhaust-gas aftertreatment system.

It is furthermore considered to be advantageous if the internal combustion engine can be started or is started only after the second predefined state of the exhaust-gas aftertreatment system has been attained.

In particular, it is provided that, in the second operating state, a maximum power of the internal combustion engine that can be demanded by the driver is limited to a value below the maximum possible power of the internal combustion engine. This is advantageous in particular if, although the predefined state of the exhaust-gas aftertreatment system is sufficient to avoid high emissions during launching, the efficiency of the exhaust-gas aftertreatment system can be increased still further by further warming of the exhaust-gas aftertreatment system. Owing to the fact that the maximum power that can be demanded by the driver is limited to a value below the maximum possible power value of the internal combustion engine, high emissions owing to a high power output of the internal combustion engine are avoided. It is by all means conceivable for the maximum power of the internal combustion engine that can be demanded by the driver to increase continuously over time in the second operating state.

It is considered to be advantageous if the maximum power that can be demanded by the driver is dependent on the state of the exhaust-gas aftertreatment system, and in particular, the maximum possible power of the internal combustion engine can be demanded by the driver after a further predefined state of the exhaust-gas aftertreatment system has been attained.

It is considered to be advantageous if the state of the exhaust-gas aftertreatment system is determined on the basis of the temperature of the exhaust-gas aftertreatment system, in particular on the basis of the temperature of a catalytic converter.

It is considered to be particularly advantageous if the vehicle has an electric motor, wherein launching using the electric motor is possible irrespective of the state of the exhaust-gas aftertreatment system.

It is however by all means also conceivable for the drivetrain to have no further drive assemblies in addition to the internal combustion engine. The vehicle is thus a purely combustion-powered vehicle.

The vehicle according to aspects of the invention is in particular suitable for carrying out the method according to aspects of the invention and one or more advantageous embodiments of the method. The vehicle has a drivetrain with an internal combustion engine, wherein the vehicle has an exhaust-gas aftertreatment system for purifying exhaust gas of the internal combustion engine and furthermore has a control device, wherein the control device is configured such that, after a starting operation of the internal combustion engine, the drivetrain is operated in a first operating state, wherein, in this first operating state, the internal combustion engine is operated at idle, the exhaust-gas aftertreatment system is heated by means of the internal combustion engine, and a launch prohibition is active, wherein the launch prohibition that is active in the first operating state prevents launching of the vehicle using the internal combustion engine. The control device is furthermore configured such that, after a predefined state of the exhaust-gas aftertreatment system has been attained, the drivetrain is operated in a second operating state, wherein the launch prohibition is inactive in the second operating state, such that launching using the internal combustion engine is possible in the second operating state.

In one advantageous embodiment of the vehicle, it is provided that the vehicle has display means for displaying the operating state of the drivetrain and/or the state of the launch prohibition and/or the maximum power that can be demanded.

BRIEF DESCRIPTION OF THE DRAWING FIGURE

In the following FIGURE, the invention will be described on the basis of an exemplary embodiment, without being restricted thereto.

In the FIGURE:

FIG. 1 shows a diagram for comparing different forms of launching.

DETAILED DESCRIPTION OF THE INVENTION

FIG. 1 shows, by way of example, different power curves for different forms of launching of a vehicle after a starting operation of an internal combustion engine of the vehicle. The curve with the reference designation 1 shows a power curve in the case of sporty launching. The curve 2 shows an upper limit in the case of emissions-compliant launching. The curve 3 shows a power curve in the case of launching in accordance with the WLTC test cycle (Worldwide harmonised Light duty Test Cycle). The curve with the reference designation 4 shows a power curve in the case of launching according to aspects of the invention.

The area of the diagram as per FIG. 1 above the curve 2 corresponds to a range with high emissions, and the region below the curve 2 corresponds to a range with low emissions. Accordingly, a power curve in the region below the curve 2 is to be considered advantageous with regard to emissions.

In the case of sporty launching, that is to say launching with an extremely high engine power demand already a short time after the engine starting operation, the exhaust-gas aftertreatment system is not yet at the required temperature, such that the exhaust-gas aftertreatment is relatively poor or incomplete, with the result that, in the case of a sporty starting-off operation in accordance with curve 1, an increased output of harmful emissions occurs.

In the method according to aspects of the invention, it is provided that, after a starting operation of the internal combustion engine, the drivetrain is operated in a first operating state, wherein, in this first operating state, the internal combustion engine is operated at idle. Accordingly, in this first operating state, the exhaust-gas aftertreatment system is heated by means of the internal combustion engine, wherein, owing to the idling operation, only small quantities of exhaust gas enter into the exhaust-gas aftertreatment system, such that the exhaust-gas aftertreatment system can adequately treat said exhaust gases. In this first operating state, a launch prohibition is active, such that launching using the internal combustion engine is prevented.

In the present example as per FIG. 1, the drivetrain is operated in the first operating state in the first time interval 5 after the starting of the engine, that is to say from the time point 0 to the time point at approximately 6 seconds. This is followed by a second time interval 6, wherein, in this time interval, the drivetrain is operated in a second operating state, wherein the launch prohibition is inactive in the second operating state, such that launching using the internal combustion engine is possible in the second operating state, that is to say proceeding from the time point of approximately 6 seconds after the engine starting operation.

Furthermore, in the second operating state, that is to say in the second time interval 6, a maximum power of the internal combustion engine that can be demanded by the driver is limited to a value below the maximum possible power of the internal combustion engine. In this way, further heating of the exhaust-gas aftertreatment system can take place in order to increase the efficiency of the exhaust-gas aftertreatment system. The maximum power of the internal combustion engine that can be demanded by the driver is increased continuously in the range of the second time interval 6.

LIST OF REFERENCE DESIGNATIONS

1 Power curve in the case of sporty launching
2 Upper limit in the case of emissions-compliant launching
3 Power curve in the case of launching in accordance with WLTC
4 Power curve in the case of launching according to aspects of the invention
5 First time interval
6 Second time interval

What is claimed:

1. A method for operating an internal combustion engine of a drivetrain of a vehicle during launching, wherein the vehicle has an exhaust-gas after treatment system for purifying exhaust gas produced by the internal combustion engine, said method comprising:
after a starting operation of the internal combustion engine has commenced, operating the drivetrain in a first operating state, wherein, in the first operating state, the internal combustion engine is operated at idle, the exhaust-gas after treatment system is heated by the internal combustion engine, and a launch prohibition is active to prevent launching using the internal combustion engine; and
after a predefined state of the exhaust-gas after treatment system has been attained, operating the drivetrain in a second operating state, wherein the launch prohibition is inactive in the second operating state, such that launching using the internal combustion engine is possible in the second operating state,
wherein, in the second operating state, the method comprises limiting a maximum power of the internal combustion engine that can be demanded by the driver to a value below a maximum possible power of the internal combustion engine, wherein the maximum power that can be demanded by the driver is dependent on a state of the exhaust-gas after treatment system, and, the maximum possible power of the internal combustion engine can be demanded by the driver after a further predefined state of the exhaust-gas after treatment system has been attained such that further heating of the exhaust gas after treatment system can take place.

2. The method as claimed in claim 1, wherein the exhaust-gas after treatment system has an electrically heatable catalytic converter, and the method comprises electrically heating the exhaust-gas after treatment system prior to the starting operation of the internal combustion engine.

3. The method as claimed in claim 1, wherein a state of the exhaust-gas after treatment system is determined on a basis of a temperature of the exhaust-gas after treatment system.

4. The method as claimed in claim 1, wherein the vehicle has an electric motor, wherein launching using the electric motor is possible irrespective of a state of the exhaust-gas after treatment system.

5. The method as claimed in claim 1, wherein the drivetrain has no further drive assemblies in addition to the internal combustion engine.

6. The method as claimed in claim 1, wherein the maximum power that can be demanded by the driver is increased continuously as the state of the exhaust-gas after treatment system reaches said further predefined state.

7. The method as claimed in claim 1 further comprising displaying the operating state of the drivetrain, the state of the launch prohibition and a maximum power that can be demanded.

8. A vehicle comprising:
a drivetrain including an internal combustion engine,
an exhaust-gas after treatment system for purifying exhaust gas produced by the internal combustion engine,
a control device configured such that, after a starting operation of the internal combustion engine, the drivetrain is operated in a first operating state, wherein, in the first operating state, the internal combustion engine is operated at idle, the exhaust-gas after treatment system is heated by the internal combustion engine, and a launch prohibition is active, wherein the launch prohibition that is active in the first operating state prevents launching of the vehicle using the internal combustion engine,
wherein the control device is further configured such that, after a predefined state of the exhaust-gas after treatment system has been attained, the drivetrain is operated in a second operating state, wherein the launch prohibition is inactive in the second operating state, such that launching using the internal combustion engine is possible in the second operating state,
wherein, in the second operating state, a maximum power of the internal combustion engine that can be demanded by the driver is limited to a value below a maximum possible power of the internal combustion engine, wherein the control device is further configured such that the maximum power that can be demanded by the driver is dependent on a state of the exhaust-gas after treatment system, and, the maximum possible power of the internal combustion engine can be demanded by the driver after a further predefined state of the exhaust-gas after treatment system has been attained such that further heating of the exhaust gas after treatment system can take place.

9. The vehicle as claimed in claim 8, wherein the vehicle has a display for displaying the operating state of the drivetrain and/or the state of the launch prohibition and/or a maximum power that can be demanded.

10. The vehicle as claimed in claim 8, wherein the control device is further configured to continuously increase the maximum power that can be demanded by the driver as the state of the exhaust-gas after treatment system reaches said further predefined state.

11. The vehicle as claimed in claim 8 further comprising an electric motor, wherein the control device is configured to activate the electric motor to launch the vehicle, while the internal combustion engine continues to be operated at idle, until the state of the exhaust-gas after treatment system reaches said further predefined state.

12. The vehicle as claimed in claim 8, wherein the launch prohibition that is active in the first operating state prevents engagement of a drive gear of the vehicle.

13. The vehicle as claimed in claim 8, wherein the launch prohibition that is active in the first operating state prevents a rotational speed of the internal combustion engine from being influenced by a depression of an accelerator pedal of the vehicle.

14. The vehicle as claimed in claim 8, wherein the vehicle has a display for displaying the operating state of the drivetrain, the state of the launch prohibition and a maximum power that can be demanded.

\* \* \* \* \*